(12) United States Patent
Huang et al.

(10) Patent No.: US 11,876,459 B2
(45) Date of Patent: Jan. 16, 2024

(54) POWER CONVERSION SYSTEM APPLIED TO SOLID STATE TRANSFORMER AND CHARGING SYSTEM HAVING THE SAME

(71) Applicant: DELTA ELECTRONICS, INC., Taoyuan (TW)

(72) Inventors: Wen-Lung Huang, Taoyuan (TW); Sheng-Hua Li, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 325 days.

(21) Appl. No.: 17/323,758

(22) Filed: May 18, 2021

(65) Prior Publication Data

US 2022/0115960 A1 Apr. 14, 2022

(30) Foreign Application Priority Data

Oct. 13, 2020 (CN) .......................... 202011091710.1

(51) Int. Cl.
*H02J 7/00* (2006.01)
*H02M 7/217* (2006.01)
*H02J 7/02* (2016.01)

(52) U.S. Cl.
CPC .............. *H02M 7/217* (2013.01); *H02J 7/02* (2013.01); *H02J 2207/20* (2020.01)

(58) Field of Classification Search
USPC ......................................................... 320/137
See application file for complete search history.

(56) References Cited

U.S. PATENT DOCUMENTS

| | | | |
|---|---|---|---|
| 2013/0197704 A1* | 8/2013 | Pan | H02J 3/381 363/35 |
| 2016/0072398 A1 | 3/2016 | Deboy | |
| 2016/0261205 A1* | 9/2016 | Kolar | H02M 1/32 |
| 2017/0012549 A1* | 1/2017 | Abe | H02M 3/1588 |

(Continued)

FOREIGN PATENT DOCUMENTS

| | | | |
|---|---|---|---|
| CN | 102025182 A * | 4/2011 | |
| EP | 3002864 A1 * | 4/2016 | ............ H02M 7/217 |
| EP | 3109992 A1 | 12/2016 | |

OTHER PUBLICATIONS

Office Action of TW Application No. 109135343, dated Aug. 30, 2021, 7 pages.

(Continued)

*Primary Examiner* — Brian Ngo
(74) *Attorney, Agent, or Firm* — Muncy, Geissler, Olds & Lowe, P.C.

(57) ABSTRACT

A power conversion system applied to a solid state transformer includes a DC link, a plurality of capacitors, and a plurality of power conversion module assemblies. The plurality of capacitors is coupled in series between a positive bus and a negative bus of the DC link. Each of the power conversion module assemblies has a plurality of DC conversion modules. In any of the power conversion module assemblies, input sides of the DC conversion modules are connected in series to form two input ends of the power conversion module assembly, and output sides of the DC conversion modules are connected in parallel to form two output ends of the power conversion module assembly. Each of the plurality of power conversion module assemblies is correspondingly connected to each of the plurality of capacitors.

11 Claims, 8 Drawing Sheets

(56) References Cited

U.S. PATENT DOCUMENTS

2019/0386579 A1   12/2019  Leong
2020/0091704 A1*  3/2020  Huang ................. H02H 7/1213
2022/0115960 A1*  4/2022  Huang ..................... H02J 7/02

OTHER PUBLICATIONS

Search Report of EP Application No. 21174703.5, dated Oct. 19, 2021, 9 pages.

* cited by examiner

POWER CONVERSION SYSTEM APPLIED TO SOLID STATE TRANSFORMER AND CHARGING SYSTEM HAVING THE SAME

BACKGROUND

Technical Field

The present disclosure relates to a power conversion system and a charging system having the same, and more particularly to a power conversion system applied to a solid state transformer and a charging system having the same.

Description of Related Art

The statements in this section merely provide background information related to the present disclosure and do not necessarily constitute prior art.

Please refer to FIG. 1, which shows a block diagram of a power system of a conventional high-power EV (Electric Vehicle) charging station. The power system provides a medium-voltage input voltage $V_{AC}$, which is for example but not limited to 13.2 kV. The medium-voltage input voltage $V_{AC}$ is transmitted to a transformer 10A through an electric tower and transmission lines. The transformer 10A is a line-frequency transformer, which operates at a working frequency of the power grid (for example, 50 Hz or 60 Hz). However, the line-frequency transformer is typically heavy, bulky, and has high standby iron loss.

The 13.2-kV medium-voltage input voltage $V_{AC}$ is converted into a low-voltage AC voltage, such as 480 volts by the transformer 10A, and the low-voltage AC voltage is converted and adjusted by a power factor corrector 20A to a low-voltage DC voltage. Afterward, the low-voltage DC voltage is converted into a DC output voltage $V_{DC}$ by a DC converter 30A, i.e., a DC-to-DC converter, for supplying power to a charging station.

Therefore, in addition to the above-mentioned disadvantages of the line-frequency transformer, the power system of the conventional high-power EV charging station also has a problem of low efficiency due to the multiple stages of power conversion.

With the development of power electronic components, distributed energy resources, and smart grids, solid state transformers (SSTs) have become an increasingly hot research topic. Solid state transformers have multi-function and high-performance features, such as microgrid integration, power factor correction, reactive power compensation, fault current isolation, adjustable output voltage, and so on.

However, the power supply apparatuses in SST applications still face challenges such as to provide flexible power supply configurations to meet different power supply requirements, and to fast charge electric vehicles with high efficiency and safety. Therefore, how to design a power conversion system applied to the SST and a charging system having the power conversion system to meet high-voltage and/or high-current charging requirements, improve the flexibility and diversification of electric vehicle charging applications, and increase the reliability of the charging system is an important subject researched by the inventors of the present disclosure.

SUMMARY

An object of the present disclosure is to provide a power conversion system applied to a solid state transformer to solve the above-mentioned disadvantages of the conventional line-frequency transformer, such as heavy weight, bulky, high standby iron loss, and low system efficiency due to multiple stages of power conversion.

In order to achieve the above-mentioned object, the power conversion system includes a DC link, a plurality of capacitors, and a plurality of power conversion module assemblies. The DC link includes a positive bus and a negative bus. The plurality of capacitors is coupled in series between the positive bus and the negative bus. Each of the power conversion module assemblies includes a plurality of DC conversion modules. In any of the power conversion module assemblies, input sides of the DC conversion modules are connected in series to form two input ends of the power conversion module assembly, and output sides of the DC conversion modules are connected in parallel to form two output ends of the power conversion module assembly. Each of the plurality of power conversion module assemblies is correspondingly connected to each of the plurality of capacitors.

In one embodiment, each of the plurality of capacitors is correspondingly connected between the two input ends of each of the plurality of power conversion module assemblies, and the two output ends of the plurality of power conversion module assemblies are connected in parallel.

In one embodiment, each of the plurality of capacitors is correspondingly connected between the two input ends of each of the plurality of power conversion module assemblies, and the two output ends of the plurality of power conversion module assemblies are connected in series.

In one embodiment, the DC link further includes a midpoint bus, and the plurality of capacitors include a first capacitor coupled between the positive bus and the midpoint bus, and a second capacitor coupled between the midpoint bus and the negative bus.

In one embodiment, a number of the plurality of power conversion module assemblies is 2N, and N is a positive integer greater than or equal to 2. The two input ends of half of the power conversion module assemblies are connected to the first capacitor, and the two input ends of the other half of the power conversion module assemblies are connected to the second capacitor. The two output ends of each power conversion module assembly connected to the first capacitor are correspondingly connected in series with the two output ends of each power conversion module assembly connected to the second capacitor to form an output port so as to provide N output ports, and the N output ports are connected in parallel.

In one embodiment, a number of the plurality of power conversion module assemblies is 2N, and N is a positive integer greater than or equal to 2. The two input ends of half of the power conversion module assemblies are connected to the first capacitor, and the two input ends of the other half of the power conversion module assemblies are connected to the second capacitor. The two output ends of each power conversion module assembly connected to the first capacitor are correspondingly connected in parallel with the two output ends of each power conversion module assembly connected to the second capacitor to form an output port so as to provide N output ports, and the N output ports are connected in parallel.

In one embodiment, the power conversion system supplies power to a charging station or an energy storage system.

Another object of the present disclosure is to provide a charging system for solid state transformer application to solve the above-mentioned disadvantages of the conventional line-frequency transformer, such as heavy weight, bulky, high standby iron loss, and low system efficiency due to multiple stages of power conversion.

In order to achieve the above-mentioned object, the charging system includes an AC-to-DC conversion circuit, at least one power conversion system, and at least one charging station. The AC-to-DC conversion circuit receives an input voltage, converts the input voltage into a high DC voltage, and provides the high DC voltage to a DC link. The at least one power conversion system is coupled to the DC link, and receives the high DC voltage and converts the high DC voltage into at least one output voltage. The at least one charging station is correspondingly coupled to the at least one power conversion system, and powered by the at least one output voltage.

In one embodiment, the at least one power conversion system is plural, and input sides of the plural power conversion systems are connected in parallel.

In one embodiment, the at least one power conversion system is plural, and connection configurations of the plural power conversion systems are the same, or at least one is different from the others.

In one embodiment, the input voltage is medium-voltage.

Accordingly, the power conversion system applied to the solid state transformer (SST) and the charging system for SST application are provided to meet high-voltage and/or high-current charging requirements, improve the flexibility and diversification of electric vehicle charging applications, and increase the reliability of the charging system.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawings as follows.

DETAILED DESCRIPTION

Figure 1:
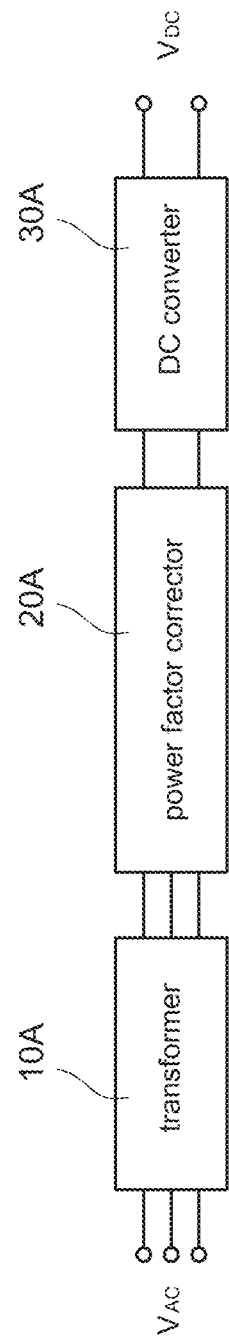
FIG. 1 is a block diagram of a power system of a conventional high-power EV charging station.

Reference will now be made to the drawing figures to describe the present disclosure in detail. It will be understood that the drawing figures and exemplified embodiments of present disclosure are not limited to the details thereof.

Figure 2:
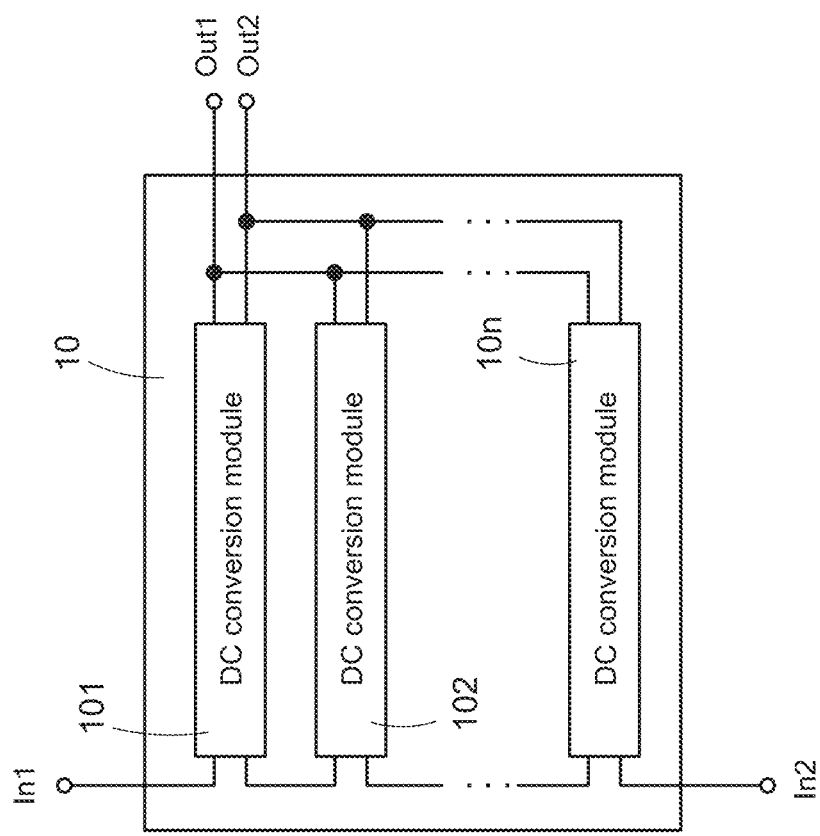
FIG. 2 is a block diagram of an exemplary single power conversion module assembly according to the present disclosure.
Figure 3:
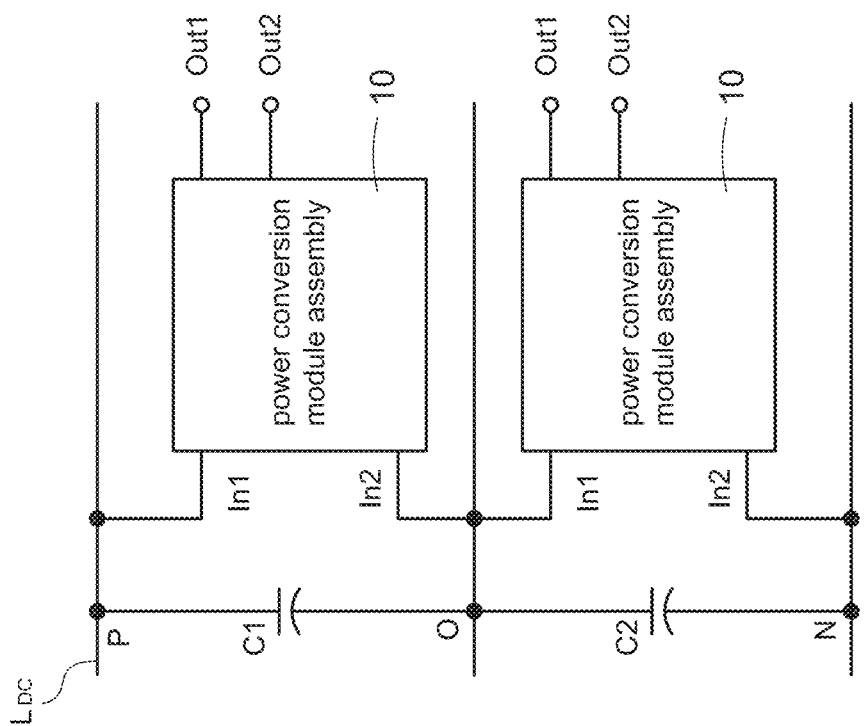
FIG. 3 is a block diagram of an exemplary connection configuration of two power conversion module assemblies connected to a DC link according to the present disclosure.

FIG. 2 and FIG. 3 respectively illustrate block diagrams of an exemplary single power conversion module assembly and an exemplary connection configuration of two power conversion module assemblies connected to a DC link according to the present disclosure. The power conversion system applied to an SST (solid-state transformer) includes a DC link $L_{DC}$, a first capacitor C1, a second capacitor C2, and at least two power conversion module assemblies 10. The DC link $L_{DC}$ has a positive bus P, a negative bus N, and a midpoint bus O. The first capacitor C1 is coupled between the positive bus P and the midpoint bus O; the second capacitor C2 is coupled between the negative bus N and the midpoint bus O. Basically, if the capacitances of the first capacitor C1 and the second capacitor C2 are equal, the voltage across the first capacitor C1 and the voltage across the second capacitor C2 will be equal, being half of the voltage of the DC link $L_{DC}$ (voltage between the positive bus P and the negative bus O). In one embodiment, the voltage across the first capacitor C1 or the voltage across the second capacitor C2 is substantially equal to 11 kV. In practical applications, it is not limited to the exemplary architecture that only includes the first capacitor C1 and the second capacitor C2 in series, that is, the present disclosure is not limited to use two capacitors in series between the DC link $L_{DC}$, and more than two capacitors can also be used in series. Accordingly, the configuration of N capacitors arranged in pair with N power conversion module assemblies should also be included in the scope of the present disclosure.

As shown in FIG. 2, the power conversion module assembly 10 includes a plurality of DC conversion modules 101, 102, . . . , 10n. Input sides of the DC conversion modules 101, 102, . . . , 10n are connected in series to form two input ends In1, In2 of the power conversion module assembly 10. Output sides of the DC conversion modules 101, 102, . . . , 10n are connected in parallel to form two output ends Out1, Out2 of the power conversion module assembly 10.

As shown in FIG. 3, in the present disclosure, the two input ends In1, In2 of the at least two power conversion module assemblies 10 are connected to the first capacitor C1 and the second capacitor C2, respectively. Specifically, the first capacitor C1 is connected between the two input ends In1, In2 of the upper power conversion module assembly 10, and the second capacitor C2 is connected between the two input ends In1, In2 of the lower power conversion module assembly 10.

Figure 4:
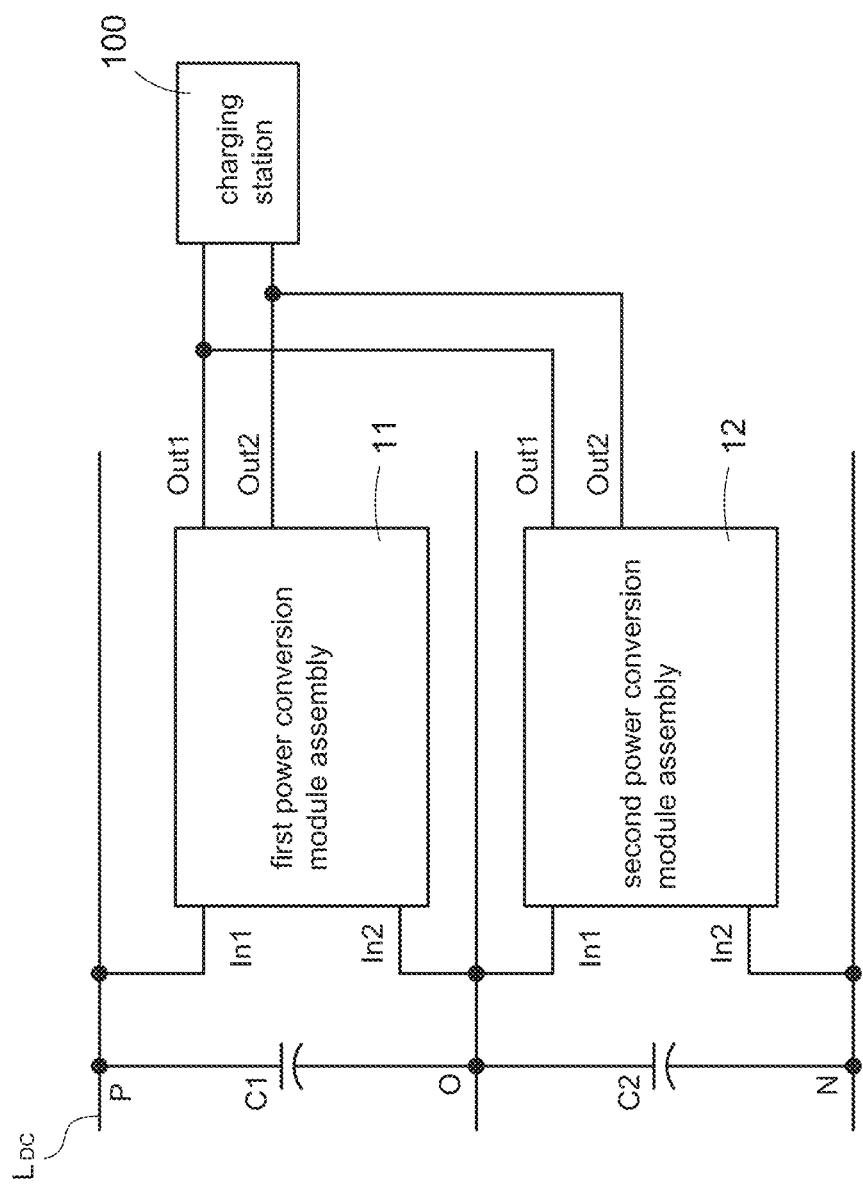
FIG. 4 is a block diagram of an exemplary connection configuration of output ends of the power conversion module assemblies connected in parallel according to a first embodiment of the present disclosure.

FIG. 4 illustrates a block diagram of an exemplary connection configuration of the output ends of the power conversion module assemblies connected in parallel according to a first embodiment of the present disclosure. As mentioned above, the two input ends In1, In2 of the two power conversion module assemblies 10 are respectively connected to the first capacitor C1 and the second capacitor C2, and the two output ends Out1, Out2 of the two power conversion module assemblies 10 are connected in parallel for supplying power to a charging station 100 (as shown in FIG. 4) or an energy storage system (not shown).

Specifically, the two power conversion module assemblies include a first power conversion module assembly 11 and a second power conversion module assembly 12. The two input ends In1, In2 of the first power conversion module assembly 11 is connected to the first capacitor C1; the two input ends In1, In2 of the second power conversion module assembly 12 is connected to the second capacitor C2. The two output ends Out1, Out2 of the first power conversion module assembly 11 and the two output ends Out1, Out2 of the second power conversion module assembly 12 are connected in parallel for supplying power to the charging station 100 or the energy storage system.

For example, if one power conversion module assembly can provide 500-volt output voltage and 200-ampere output current, then the power conversion system shown in FIG. 4 can provide 500-volt output voltage and 400-ampere output current to the charging station 100 since the first power conversion module assembly 11 and the second power conversion module assembly 12 are connected in parallel at their output sides, thereby providing double output current to meet high-current charging requirements.

Figure 5:
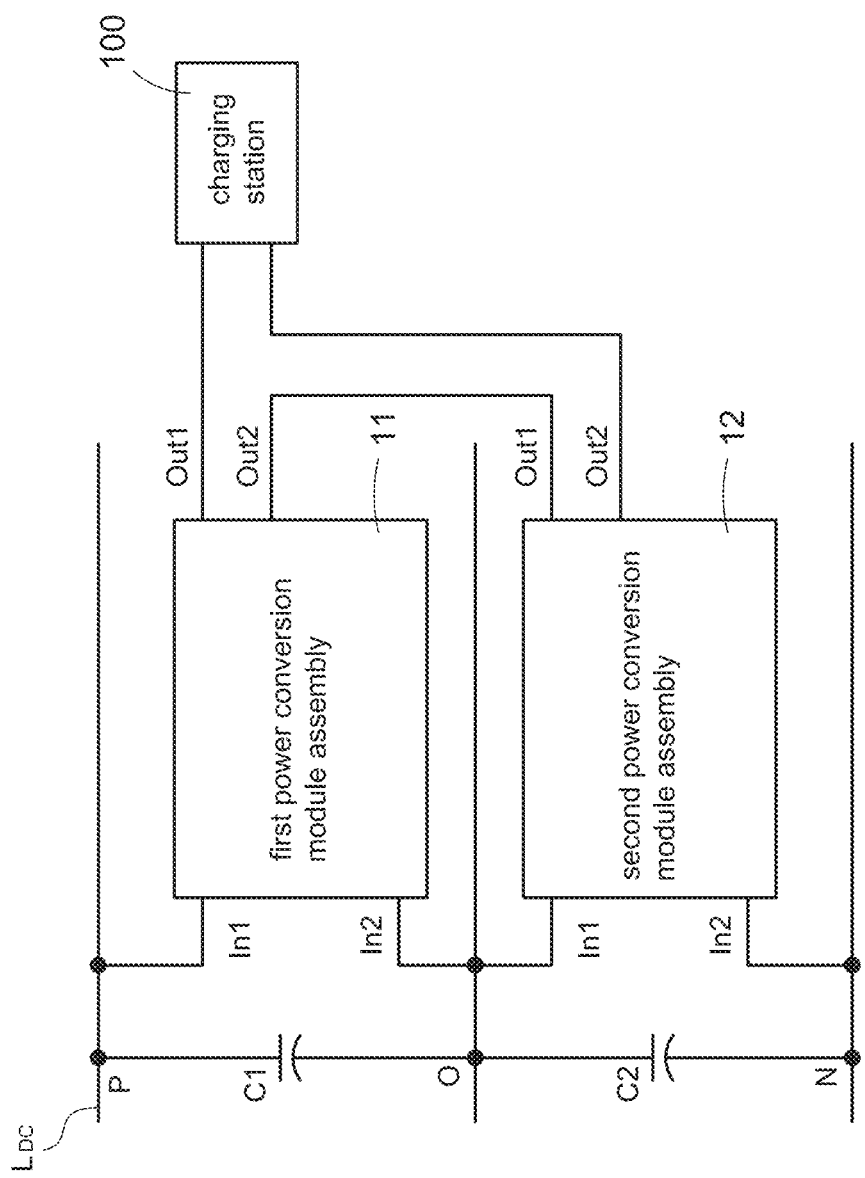
FIG. 5 is a block diagram of an exemplary connection configuration of output ends of the power conversion module assemblies connected in series according to a second embodiment of the present disclosure.

FIG. 5 illustrates a block diagram of an exemplary connection configuration of the output ends of the power conversion module assemblies connected in series according to a second embodiment of the present disclosure. As mentioned above, the two input ends In1, In2 of the two power conversion module assemblies 10 are respectively connected to the first capacitor C1 and the second capacitor C2, and the two output ends Out1, Out2 of the two power conversion module assemblies 10 are connected in series for supplying power to a charging station 100 or an energy storage system.

Specifically, the two power conversion module assemblies include a first power conversion module assembly 11 and a second power conversion module assembly 12. The two input ends In1, In2 of the first power conversion module assembly 11 is connected to the first capacitor C1; the two input ends In1, In2 of the second power conversion module assembly 12 is connected to the second capacitor C2. The two output ends Out1, Out2 of the first power conversion module assembly 11 and the two output ends Out1, Out2 of the second power conversion module assembly 12 are connected in series for supplying power to the charging station 100 or the energy storage system.

For example, if one power conversion module assembly can provide 500-volt output voltage and 200-ampere output current, then the power conversion system shown in FIG. 5 can provide 1000-volt output voltage and 200-ampere output current to the charging station 100 since the first power conversion module assembly 11 and the second power conversion module assembly 12 are connected in series at the output sides, thereby providing double output voltage to meet high-voltage charging requirements.

Figure 6:
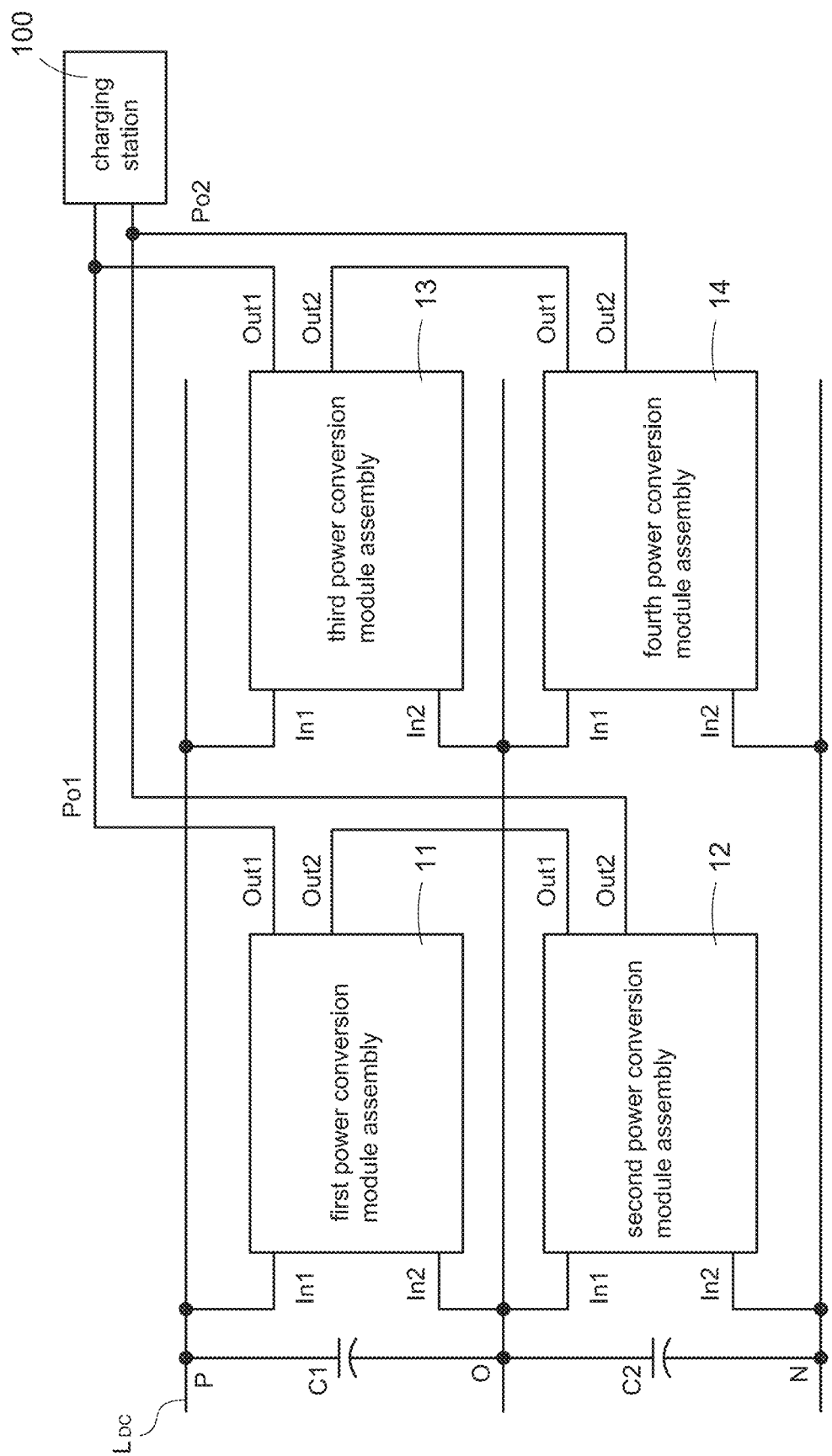
FIG. 6 is a block diagram of an exemplary connection configuration of the power conversion module assemblies according to a third embodiment of the present disclosure.

FIG. 6 illustrates a block diagram of an exemplary connection configuration of the power conversion module assemblies according to a third embodiment of the present disclosure. The number of the at least two power conversion module assemblies is four. The two input ends In1, In2 of two (11, 13) of the four power conversion module assemblies are connected to the first capacitor C1, and the two input ends In1, In2 of the other two (12, 14) power conversion module assemblies are connected to the second capacitor C2. The two output ends Out1, Out2 of one (11) of the power conversion module assemblies connected to the first capacitor C1 are correspondingly connected in series with the two output ends Out1, Out2 of one (12) of the power conversion module assemblies connected to the second capacitor C2 to form a first output port Po1. The two output ends Out1, Out2 of the other power conversion module assembly 13 connected to the first capacitor C1 are correspondingly connected in series with the two output ends Out1, Out2 of the other power conversion module assembly 14 connected to the second capacitor C2 to form a second output port Po2. The second output port Po2 and the first output port Po1 are connected in parallel.

Specifically, the four power conversion module assemblies include a first power conversion module assembly 11, a second power conversion module assembly 12, a third power conversion module assembly 13, and a fourth power conversion module assembly 14. The two input ends In1, In2 of the first power conversion module assembly 11 and the two input ends In1, In2 of the third power conversion module assembly 13 are connected to the first capacitor C1; the two input ends In1, In2 of the second power conversion module assembly 12 and the two input ends In1, In2 of the fourth power conversion module assembly 14 are connected to the second capacitor C2. The two output ends Out1, Out2 of the first power conversion module assembly 11 and the two output ends Out1, Out2 of the second power conversion module assembly 12 are connected in series to form a first output port Po1; the two output ends Out1, Out2 of the third power conversion module assembly 13 and the two output ends Out1, Out2 of the fourth power conversion module assembly 14 are connected in series to form a second output port Po2. The first output port Po1 and the second output port Po2 are connected in parallel for supplying power to the charging station 100 or the energy storage system.

For example, if one power conversion module assembly can provide 500-volt output voltage and 200-ampere output current, then the power conversion system shown in FIG. 6 can provide 1000-volt output voltage and 400-ampere output current to the charging station 100 since the first power conversion module assembly 11 and the second power conversion module assembly 12 are connected in series at their output sides, the third power conversion module assembly 13 and the fourth power conversion module assembly 14 are connected in series at their output sides, and the first output port Po1 and the second output port Po2 are connected in parallel, thereby providing double output voltage and double output current to meet high-voltage and high-current charging requirements.

Figure 7:
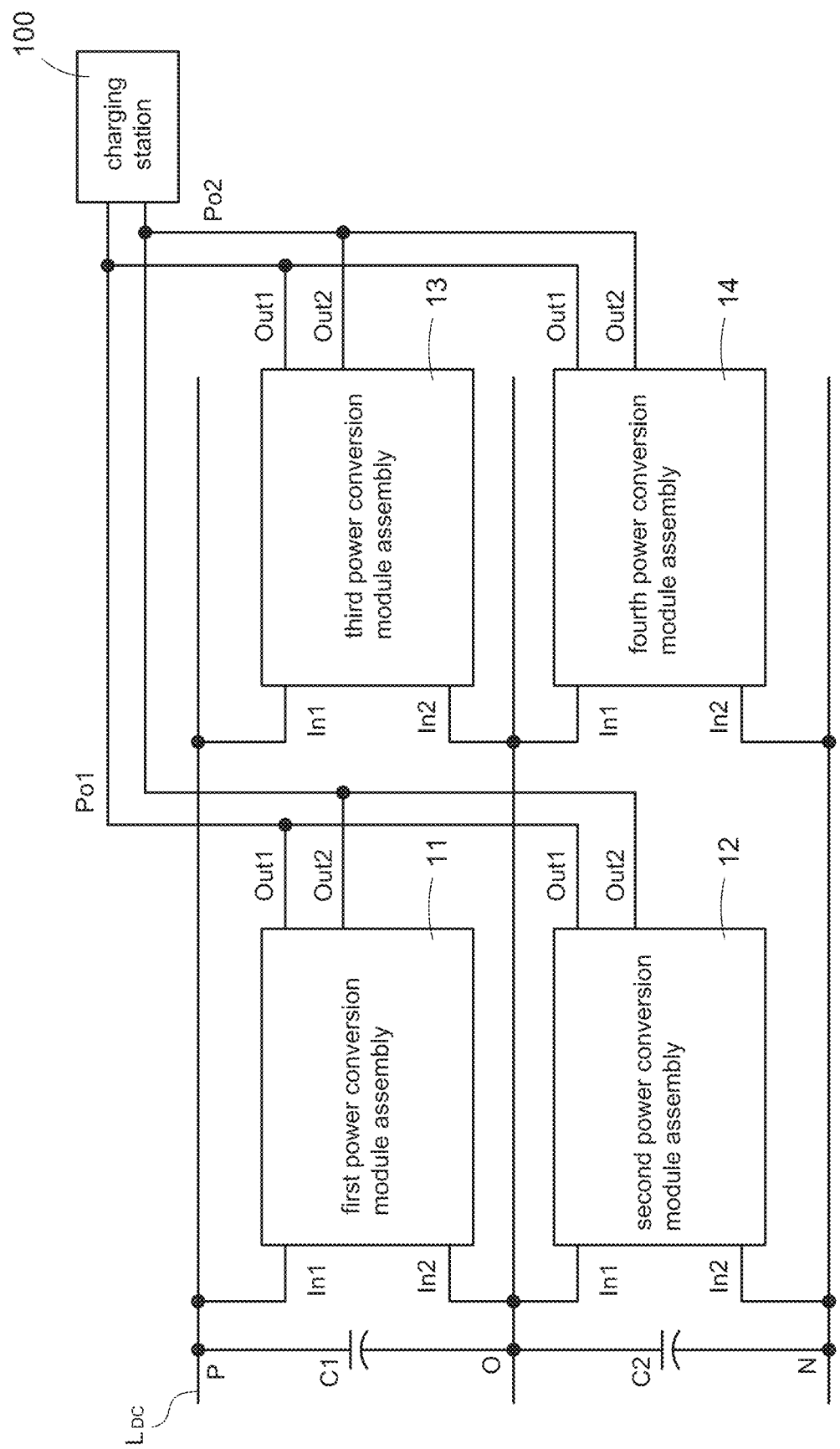
FIG. 7 is a block diagram of an exemplary connection configuration of the power conversion module assemblies according to a fourth embodiment of the present disclosure.

FIG. 7 illustrates a block diagram of an exemplary connection configuration of the power conversion module assemblies according to a fourth embodiment of the present disclosure. The number of the at least two power conversion module assemblies is four. The two input ends In1, In2 of two (11, 13) of the four power conversion module assemblies are connected to the first capacitor C1, and the two input ends In1, In2 of the other two power conversion module assemblies (12, 14) are connected to the second capacitor C2. The two output ends Out1, Out2 of one (11) of the power conversion module assemblies connected to the first capacitor C1 are correspondingly connected in parallel with the two output ends Out1, Out2 of one (12) of the power conversion module assemblies connected to the second capacitor C2 to form a first output port Po1. The two output ends Out1, Out2 of the other power conversion module assembly 13 connected to the first capacitor C1 are correspondingly connected in parallel with the two output ends Out1, Out2 of the power conversion module assembly 14 connected to the second capacitor C2 to form a second output port Po2. The second output port Po2 and the first output port Po1 are connected in parallel.

Specifically, the four power conversion module assemblies include a first power conversion module assembly 11, a second power conversion module assembly 12, a third power conversion module assembly 13, and a fourth power conversion module assembly 14. The two input ends In1, In2 of the first power conversion module assembly 11 and the two input ends In1, In2 of the third power conversion module assembly 13 are connected to the first capacitor C1; the two input ends In1, In2 of the second power conversion module assembly 12 and the two input ends In1, In2 of the fourth power conversion module assembly 14 are connected to the second capacitor C2. The two output ends Out1, Out2 of the first power conversion module assembly 11 and the two output ends Out1, Out2 of the second power conversion module assembly 12 are connected in parallel to form a first output port Po1; the two output ends Out1, Out2 of the third power conversion module assembly 13 and the two output ends Out1, Out2 of the fourth power conversion module assembly 14 are connected in parallel to form a second output port Po2. The first output port Po1 and the second output port Po2 are connected in parallel for supplying power to the charging station 100 or the energy storage system.

For example, if one power conversion module assembly can provide 500-volt output voltage and 200-ampere output current, then the power conversion system shown in FIG. 7 can provide 500-volt output voltage and 800-ampere output current to the charging station 100 since the first power conversion module assembly 11 and the second power conversion module assembly 12 are connected in parallel at their output sides, the third power conversion module assembly 13 and the fourth power conversion module assembly 14 are connected in parallel at their output sides, and the first output port Po1 and the second output port Po2 are connected in parallel, thereby providing four-times output current to meet high-current charging requirements.

In practical applications, the number of the power conversion module assemblies 10 is not limited to four, that is, a plurality of power conversion module assemblies may be paired (corresponding) to form the power conversion system. For example, the number of the power conversion module assemblies is 2N, and N is a positive integer greater than or equal to 2. The two input ends In1, In2 of half of the power conversion module assemblies are connected to the first capacitor C1, and the two input ends In1, In2 of the other half of the power conversion module assemblies are connected to the second capacitor C2. Also, the two output ends Out1, Out2 of one of the power conversion module assemblies connected to the first capacitor C1 are correspondingly connected in series or in parallel with the two output ends Out1, Out2 of the power conversion module assemblies connected to the second capacitor C2 to form an output port, so as to provide N output ports, thereby providing higher output voltage and/or higher output current to meet specific charging requirements.

Figure 8:
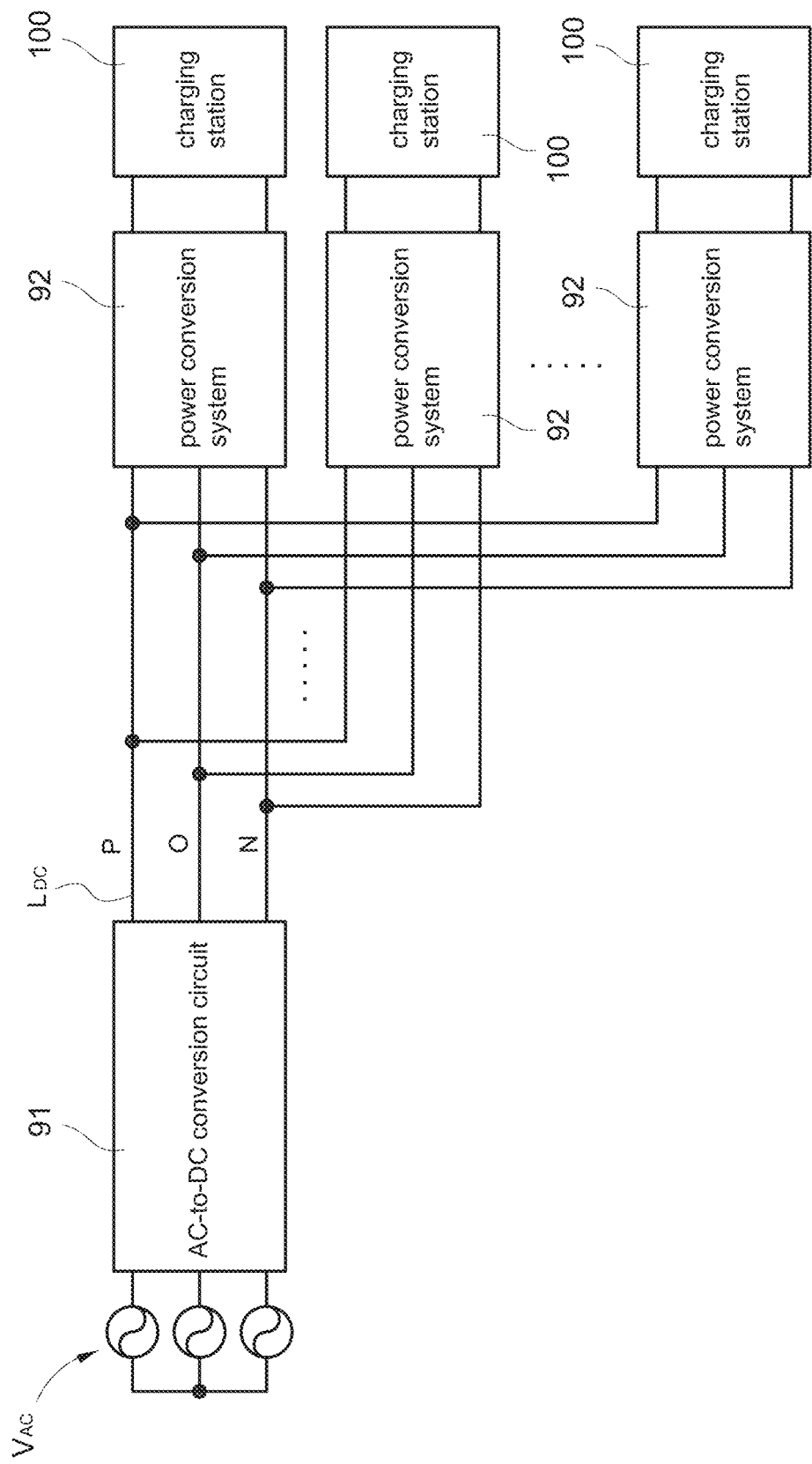
FIG. 8 is a block diagram of an exemplary charging system for SST application according to the present disclosure.

FIG. 8 illustrates a block diagram of an exemplary charging system for SST application according to the present disclosure. The charging system includes an AC-to-DC conversion circuit 91, at least one power conversion system 92, and at least one charging station 100. The AC-to-DC conversion circuit 91 receives an input voltage $V_{AC}$ and converts the input voltage $V_{AC}$ into a high-voltage DC voltage, and the high-voltage DC voltage is provided to the DC link $L_{DC}$. In one embodiment, the input voltage $V_{AC}$ is medium-voltage, for example but not limited to 13.2 kV.

The at least one power conversion system 92 is coupled to the DC link $L_{DC}$, receives the high-voltage DC voltage and converts the high-voltage DC voltage into at least one output voltage. The at least one charging station 100 is correspondingly coupled to the at least one power conversion system 92, and is powered by the at least one output voltage. As shown in FIG. 8, a plurality of power conversion systems 92 are connected in parallel at the input sides of the power conversion systems 92, and the input sides of the power conversion systems 92 are connected to the DC link $L_{DC}$ at the output side of the AC-to-DC conversion circuit 91, and the output sides of the power conversion systems 92 are correspondingly connected to the charging stations 100. For example, if the number of the power conversion systems 92 is four, the number of the charging stations 100 is also four.

Moreover, the at least one power conversion system 92 may be any of the aforementioned four power conversion systems. In other words, the connection configuration of each power conversion system 92 may be the same, or at least one may be different from the others. Take four power conversion systems 92 as example, the four power conversion systems 92 can respectively implement the connection configurations of FIG. 4 to FIG. 7 (i.e., the four power conversion systems 92 are completely different), or the four power conversion systems 92 can implement the same one configuration of FIG. 4 to FIG. 7, (i.e., the four power conversion systems 92 are completely the same), or at least one is different but the others are the same.

In conclusion, the present disclosure has following features and advantages:

1. Diverse connection configuration design of power conversion systems can flexibly meet the high-voltage and/or high-current charging requirements.

2. With a plurality of power conversion systems that may be the same or at least one is different, the charging system can increase the flexibility and diversification of charging electric vehicle, increase the reliability of the charging system, and achieve fast charging with high efficiency and high safety.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power conversion system applied to a solid state transformer, comprising:
   a DC link comprising a positive bus and a negative bus,
   a plurality of capacitors coupled in series between the positive bus and the negative bus, and
   a plurality of power conversion module assemblies, each of the power conversion module assemblies comprising a plurality of DC conversion modules;
   wherein each of the plurality of power conversion module assemblies is correspondingly connected to each of the plurality of capacitors;
   in any of the power conversion module assemblies, input sides of the DC conversion modules are connected in series to form two input ends of the power conversion module assembly, and output sides of the DC conversion modules are connected in parallel to form two output ends of the power conversion module assembly,
   wherein the DC link further comprises a midpoint bus with a floating potential, and the plurality of capacitors comprise a first capacitor coupled between the positive bus and the midpoint bus, and a second capacitor coupled between the midpoint bus and the negative bus.

2. The power conversion system in claim 1, wherein each of the plurality of capacitors is correspondingly connected between the two input ends of each of the plurality of power conversion module assemblies, and the two output ends of the plurality of power conversion module assemblies are connected in parallel.

3. The power conversion system in claim 1, wherein each of the plurality of capacitors is correspondingly connected between the two input ends of each of the plurality of power conversion module assemblies, and the two output ends of the plurality of power conversion module assemblies are connected in series.

4. The power conversion system in claim 1, wherein the DC link further comprises a midpoint bus, and the plurality of capacitors comprise a first capacitor coupled between the positive bus and the midpoint bus, and a second capacitor coupled between the midpoint bus and the negative bus.

5. The power conversion system in claim 4, wherein a number of the plurality of power conversion module assemblies is 2N, and N is a positive integer greater than or equal to 1; the two input ends of half of the power conversion module assemblies are connected to the first capacitor, and the two input ends of the other half of the power conversion module assemblies are connected to the second capacitor; the two output ends of each power conversion module assembly connected to the first capacitor are correspondingly connected in series with the two output ends of each power conversion module assembly connected to the second capacitor to form an output port so as to provide N output ports, and the N output ports are connected in parallel.

6. The power conversion system in claim 4, wherein a number of the plurality of power conversion module assemblies is 2N, and N is a positive integer greater than or equal to 1; the two input ends of half of the power conversion module assemblies are connected to the first capacitor, and the two input ends of the other half of the power conversion module assemblies are connected to the second capacitor; the two output ends of each power conversion module assembly connected to the first capacitor are correspondingly connected in parallel with the two output ends of each power conversion module assembly connected to the second capacitor to form an output port so as to provide N output ports, and the N output ports are connected in parallel.

7. The power conversion system in claim 1, wherein the power conversion system is configured to supply power to a charging station or an energy storage system.

8. A charging system for solid state transformer application, comprising:
   an AC-to-DC conversion circuit configured to receive an input voltage, convert the input voltage into a high DC voltage, and provide the high DC voltage to a DC link,
   at least one power conversion system as claimed in claim 1 coupled to the DC link, and configured to receive the high DC voltage and convert the high DC voltage into at least one output voltage, and
   at least one charging station correspondingly coupled to the at least one power conversion system, and powered by the at least one output voltage.

9. The charging system in claim 8, wherein the at least one power conversion system is plural, and input sides of the plural power conversion systems are connected in parallel.

10. The charging system in claim 8, wherein the at least one power conversion system is plural, and connection configurations of the plural power conversion systems are the same, or at least one is different from the others.

11. The charging system in claim 8, wherein the input voltage is medium-voltage.

* * * * *